April 14, 1942.  J. F. COX  2,279,388
LOCK NUT AND METHOD OF MAKING THE SAME
Filed Aug. 14, 1941  4 Sheets-Sheet 1

Inventor:
Joseph F. Cox
by Robert, Cushman & Woodburg
Attorneys

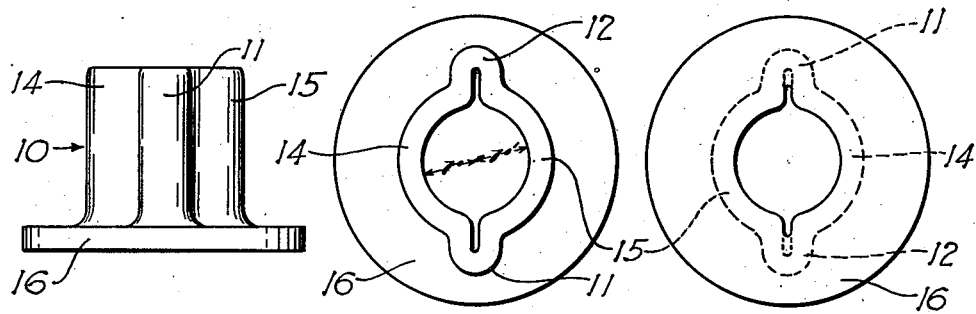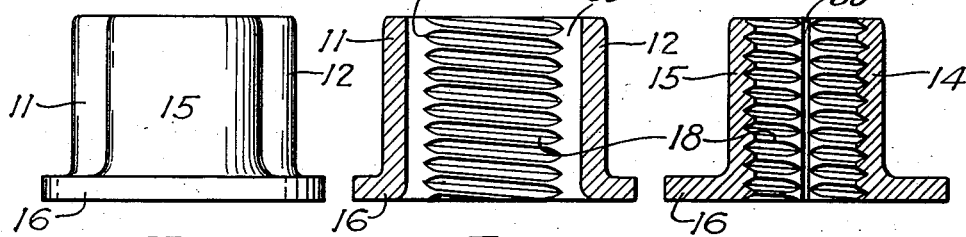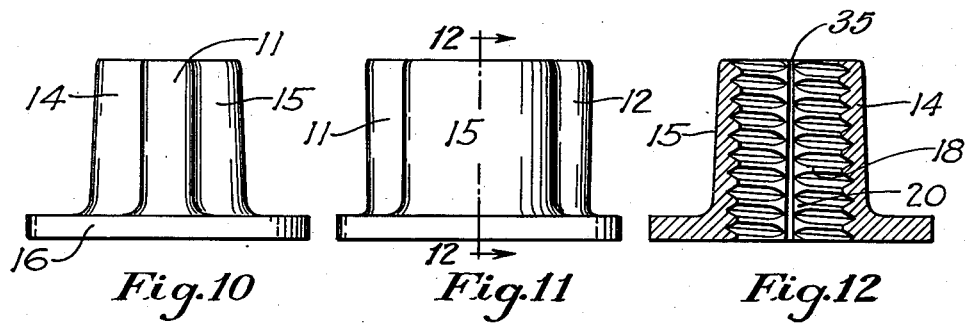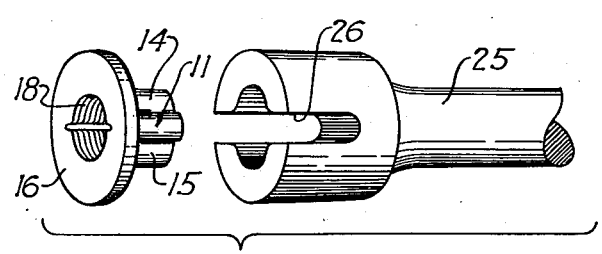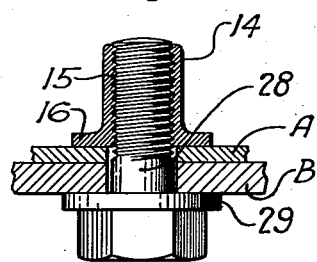

Inventor:
Joseph F. Cox
by Roberts, Cushman & Woodbury
Attorneys

April 14, 1942.　　　J. F. COX　　　2,279,388
LOCK NUT AND METHOD OF MAKING THE SAME
Filed Aug. 14, 1941　　　4 Sheets-Sheet 4

Inventor:
Joseph F. Cox
by Roberts, Cushman & Woodbury
Attorneys

Patented Apr. 14, 1942

2,279,388

UNITED STATES PATENT OFFICE 2,279,388

LOCK NUT AND METHOD OF MAKING THE SAME

Joseph F. Cox, Arlington, Mass.

Application August 14, 1941, Serial No. 406,790

10 Claims. (Cl. 10—86)

This invention relates to self-locking nuts and the like elements, and to an improved method of manufacturing the same. As illustrative of its utility the invention is described with particular reference to its adaptability to aircraft use.

In order to meet the exacting requirements of the trade, self-locking nuts must not only be of strong and durable construction, but of light weight, minimum size and reliable in operation, and furthermore, the design must be such as to lend itself to economical mass production methods so that they may be produced in large quantities at a relatively low cost. Attempts to satisfy these requirements have not been altogether successful in that lock-nuts of the type involving a two-piece construction are not only costly to manufacture, but are either too bulky or heavy, relative to other types of the same or comparable size, whereas lock-nuts of a one-piece construction usually involve either expensive machining operations, the use of intricate tools, or numerous secondary operations, all of which greatly increase the cost of manufacture. One-piece lock-nuts fabricated from stock other than sheet metal are of course relatively costly and hence their use is limited to special non-competitive fields.

The principal object of this invention is to provide a one-piece lock-nut which is of simple design and of minimum size and weight consistent with strength, and which embodies reliable and efficient locking means constituting an integral part of the structure, and which lends itself to efficient mass production manufacturing methods with economy of material.

A further object is to provide a method whereby such a lock-nut may be readily fabricated in an efficient manner from sheet metal without the necessity of employing complicated machinery, intricate tools, or an excessive number of secondary operations.

Other objects will be apparent from a consideration of the following description and the accompanying drawings, wherein Figs. 1 and 1ª are top views showing the successive stamping and drawing operations performed on a strip of sheet metal in producing a lock-nut in accordance with the present invention;

Figs. 2 and 2ª are sections on the lines 2—2 and 2ª—2ª of Figs. 1 and 1ª, respectively;

Figs. 3 and 3ª are bottom views of the strip shown in Figs. 1 and 1ª, respectively;

Figs. 4, 5 and 6 are enlarged side, top and bottom views, respectively, of the stage product when discharged from the final trimming station;

Fig. 7 is another side elevation of the stage product viewed from a position at right angles to that of Fig. 4;

Figs. 8 and 9 are sections, viewed from positions at right angles to each other, of the tapped or threaded unit before being subjected to the side closing operation;

Figs. 10 and 11 are side elevations, viewed from positions at right angles to each other, of the tapped lock-nut after having been subjected to a forming or side closing operation;

Fig. 12 is a section on the line 12—12 of Fig. 11;

Fig. 13 is a composite perspective showing the completed lock-nut and an applying instrument for use therewith;

Fig. 14 is a sectional view showing the lock-nut applied to a bolt so as to secure separable parts together;

Figures 22, 23, 24:
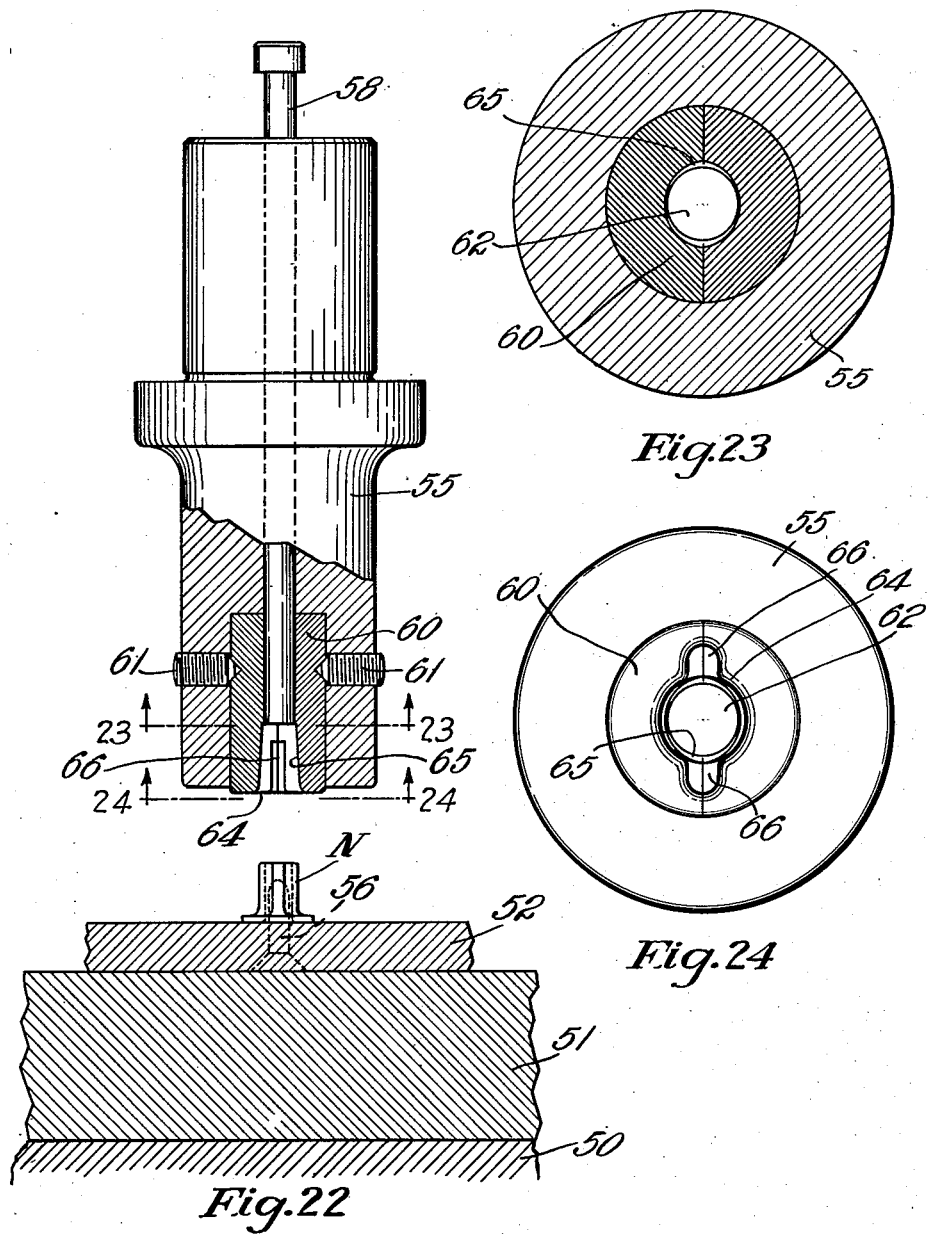

Fig. 22 is a sectional elevation of one form of closing in or setting instrumentalities; and Figs. 23 and 24 are enlarged sections on the lines 23—23 and 24—24, respectively, of Fig. 22.

In accordance with the present invention the lock-nut is fabricated from sheet metal such as cold rolled steel, aluminum or other suitable stock, the gauge depending upon the particular size of the lock-nut to be made. The strip of metal is first subjected to a series of progressive stamping and drawing operations, which may be performed by any of several well-known machines, such for example as a progressive die operation, an eyelet machine, or a transfer press, any of which may be suitably equipped to form a unitary structure having a barrel or body portion provided with one or more longitudinally extending expansion ribs, and an integral rigid base portion preferably in the form of a flange of any desired size and shape, extending outwardly from the lower end of the barrel portion. The ribs define expansible segments, each possessing a sufficient degree of resilience or elasticity so that the central and/or upper end portions of the barrel may yield radially, the degree of yield increasing progressively and attaining a predetermined maximum toward the upper end of the barrel as the screw is progressively turned, whereas the base or flange provides a relatively non-yieldable lower end portion incapable of appreciable expansion.

The unit thus formed is tapped or threaded in any conventional manner and thereafter is subjected to a closing in or setting operation in suitable dies or like instrumentalities effective to contract the side walls or segments to a predetermined inward setting but without appreciably changing the radius of curvature of the segments (which would distort the threaded areas), the result of which is to reduce permanently the effective diameter of the central and/or upper end portions of the barrel, while leaving the lower end in its original condition, it being understood that the area and extent of reduction are dependent upon the degree of free lead desired, the size of the threaded opening, and such other variables as are well known to those skilled in the art. In any event, the reduction is such that the pitch diameter of the threaded barrel is substantially less than that of the screw or bolt by an amount appreciably greater than the commercial "minus tolerance" of the bolt or screw.

When the lock-nut is applied to a bolt or like element its reduced side walls or segments are sufficiently resilient to yield radially, and as the radius of curvature of the threaded areas of the segments remain constant, they provide a true threaded engagement with and hence firmly grip the enclosed threaded portion of the bolt or screw; and when removed from the bolt, the side walls of segments retain sufficient elasticity to contract approximately to their initial position. In other words, the radial movements of the segments from contracted to expanded position are within the limits of elasticity of the segments and/or the expansion rib or ribs, as the case may be, thereby avoiding a permanent set from taking place when the segments are in an expanded position, which would result in destroying or materially impairing the gripping action of the segments.

The expansion ribs are not only effective to maintain a predetermined degree of elasticity and thus effect retraction of the segments to initial position when withdrawn from about a bolt, but also to provide lateral abutments by means of which the lock-nut may be positively held or turned by a wrench. A further advantage attributable to these ribs is that they provide a natural anchorage against rotation when fitted into the dial inserts of a dial type tapping machine preparatory to the threading operation. The base member, being flanged, not only provides a relatively non-yielding support for the expansible segments and ribs, but in addition may provide a sizable clamping jaw for holding one or more parts.

Figure 1:
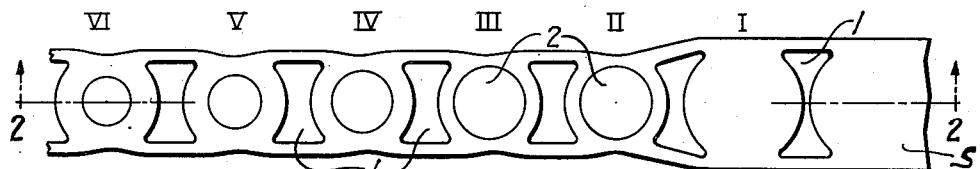
Figure 1A:
Figure 2:
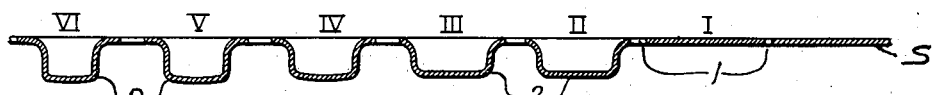
Figure 2A:
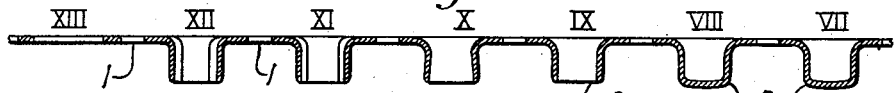
Figure 3:
Figure 3A:

In accordance with what is now considered a preferred procedure, a strip S of cold rolled sheet steel is subjected to a series of stamping and drawing operations performed by suitable dies (not shown) which constitute a series of operating stations designated I to XIII inclusive, as shown in Figs. 1 to 3ᵃ. At station I the strip S is formed with relief cutouts 1 and at stations II to VIII the metal between the cutouts 1 is progressively drawn to form a cup-shaped member 2 which is ultimated reduced to the approximate size of the barrel of the desired lock-nut. At station IX the closed end of the member 2 is punched out, as indicated at 3, and at stations X and XII the member 2 is formed with expansion ribs, best shown in Fig. 3ᵃ. At the final station XIII, the member 2 is cut away from the strip S and ejected as a stage product 10 (Figs. 4 to 7).

The stage product thus produced comprises a generally cylindrical barrel or body portion having a pair of diametrically exposed longitudinally extending expansion ribs 11 and 12 which define a pair of expansible segments 14 and 15, and a relatively rigid non-yielding lower end or base portion formed with a laterally projecting annular flange 16. The stage product 10 is then tapped or threaded in any conventional manner, thus providing threads 18 on the inner walls of the segments 14 and 15. The threading operation is carried out so that at this stage of the operation the threads 18 have a uniform pitch of the same effective diameter throughout.

After having completed the threading operation, the unit 10 is then subjected to a closing-in operation preferably performed in the manner hereinafter described in connection with Figs. 22–24, this operation being effective permanently to contract or close in the segments 14 and 15 to a predetermined setting, without appreciably affecting the radius of curvature of the threaded areas of the expansible segments.

It will be observed that as a result of the closing-in operation the central and upper end portions of the segments 14 and 15 are permanently contracted and hence the effective diameter, normal to the ribs, of these portions of the barrel is reduced, as will be noted from a comparison of Figs. 4 and 9 with Figs. 10 and 12, respectively. As previously pointed out, the extent of the closing-in operation is such as to reduce the pitch diameter of the segments 14 and 15 by an amount substantially greater than the commercial "minus tolerance" of a screw of the type to be used with the lock-nut. For example, with a one-quarter inch lock-nut, the reduction across the top or outer end may be of the order of 0.01", which is definitely beyond the elastic limits of the ribs and/or segments and hence effects a permanent set. When a screw is withdrawn after having been inserted through the full length of the barrel, actual measurement shows that the diameter of the upper end of the segments shows a substantial decrease, being of the order of 0.003" or more, thus indicating a definite spring action sufficient for the purpose intended.

Since the above closing-in operation affects only the expansible segments 14 and 15, and as the rigid non-yielding flange base 16 remains in its original condition, there is but a minimum degree of free lead, approximately equal to the thickness of the flange 16, plus the "minus tolerance" of the screw pitch diameter, and hence from beyond approximately the point 20 (Fig. 12), designating the inner limit of free lead, the threaded walls of segments 14 and 15 gradually taper so as to exert a progressively increasing grip on the threaded portion of a bolt, screw or the like element, when applied thereto.

The expansion ribs 11 and 12 provide, in effect, integral spring hinges for the segments and not only permit radial expansion within satisfactory limits when the lock-nut is applied to a bolt, but also cooperate with the base flange 16 to counteract or overcome the outward bursting forces incident to application to a bolt or screw. When withdrawn from the bolt the ribs 11 and 12 supplement the inherent resiliency of the segments and acting in conjunction therewith effect movement from expanded to retracted position and hence the lock-nut may be reused indefinitely without impairment of its resilience or elastic character.

In addition to the above-described functions of the expansion ribs 11 and 12, they also provide laterally extending abutments by means of which the lock-nut may be positively held or turned by a wrench without impairing in any degree the other functions of the expansion ribs. As here shown by way of illustration (Fig. 13) a bayonet slotted socket wrench 25 may be quickly and conveniently applied about the barrel of the lock-nut which is positively held by the engagement of the ribs 11 and 12 with the walls of the slots 26, the outer end of the wrench engaging the inner face of the flange 16 and thus holding the lock-nut squarely in position. Such a wrench may be either manually operated, or operated by any standard power driven tool without damaging or injuring the lock-nut, as by scoring or cutting into the exterior walls of the barrel.

It will be further observed that the design of the lock-nut is such that the head of the applying wrench need not be larger than the overall diameter of the lock-nut and hence the lock-nut may be easily applied in limited or confined spaces.

When applied to a bolt 28 in the manner illustrated in Fig. 14, the end of the bolt first enters the barrel freely to a depth indicated by the point 20, and as one of the parts is rotated the segments 14 and 15 are expanded radially against the inherent spring action of the segments and expansion ribs, causing the former to assume a position somewhat less than their original position before the closing-in operation. It is thus apparent that in the process of expanding a resistance to turning is effected which conversely is effective to restrain rotation in the opposite direction.

It will also be noted that the flange base 16 affords a sizable bearing surface which cooperates with the head of the bolt 28 and/or washer 29 carried thereby, firmly to clamp the parts A and B together. Accordingly, there is no necessity for using a lock washer and plain washer as is the case when using conventional fastening elements. A further feature of the lock-nut is that the walls of the segments have a true threaded engagement about the bolt 28 and hence assure a firm uniform grip, as distinguished from friction nuts of the elliptical type wherein only a part of the threaded wall is effective to grip the bolt.

The modifications shown in Figs. 15 to 21 are similar in all material respects to the previously described embodiment, and the same or similar reference characters have been applied to corresponding parts. Except for the shape of the forming dies constituting stations I to XIII, the method of manufacture is also substantially the same as that previously described.

Figure 15:
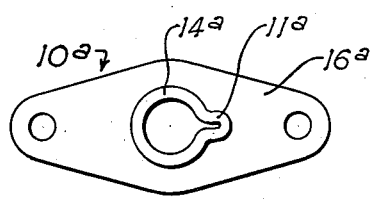
Figs. 15 and 16 are top and side views, respectively, of a modified form of lock-nut having a standard aircraft base.
Figure 16:
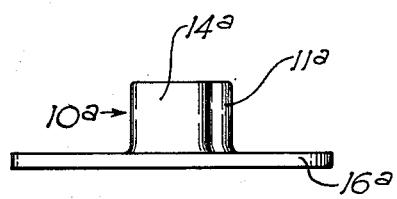

In the embodiment shown in Figs. 15 and 16 the barrel portion of the lock-nut 10$^a$ is formed with but one expansion rib 11$^a$ which provides a generally cylindrical expansible segment 14$^a$ and is shown incorporated with the so-called "anchor base" 16$^a$ commonly used in aircraft construction where the nut is to be riveted or welded to the structure.

Figure 17:
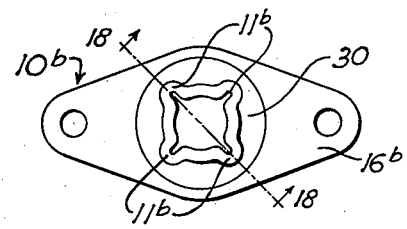
Fig. 17 is a top view of a further modification with a so-called countersunk base.
Figure 18:
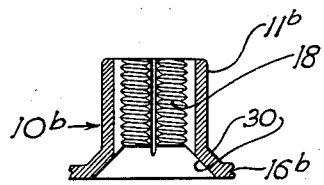
Fig. 18 is a section on the line 18—18 of Fig. 17.

In the embodiment shown in Figs. 17 and 18 the barrel portion of the lock-nut 10$^b$ is formed with four expansion ribs 11$^b$ and in this case is shown incorporated with the so-called countersunk base 30, also a standard base form used in aircraft work, it being understood that any of a variety of base forms may be used in conjunction with any of the barrel structures herein described.

Figure 19:
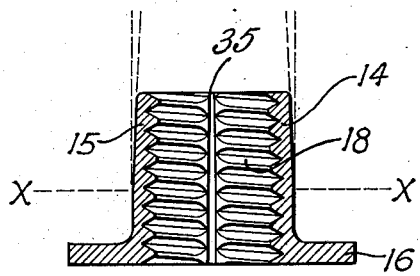
Figs. 19 and 20 are enlarged sectional elevations illustrating other modifications.

The modification shown in Fig. 19 is substantially identical to that shown in Figs. 4 to 14, except that the closing-in operation performed on the segments 14 and 15 is such as to produce an extended free lead, it being noted that the reduction in the effective diameter of the threads 18 starts at the plane indicated by the horizontal line X—X and progressively increases, as indicated by the divergent broken lines. With this design the threads 18 lying between the line X—X and the outer end of the base flange 16, are of the same diameter throughout, thus providing a greater degree of free lead than in the embodiment shown in Fig. 12, it being understood that in any case the degree of free lead may be varied to suit the requirements of the application involved.

Figure 20:
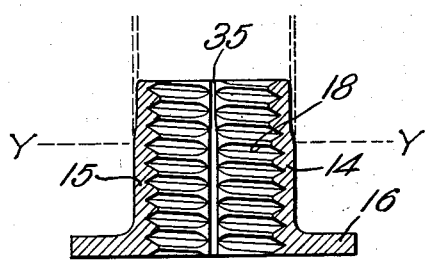

The modification shown in Fig. 20 is similar to that of Fig. 19, except that the area or zone of reduction is confined to a predetermined portion of the upper end of the barrel, defined by the line Y—Y. The threaded portion between the line Y—Y and the base 16 has a constant effective diameter, whereas the threaded portion above the line Y—Y is contracted, as indicated by the broken lines. Likewise the degree of free lead of this embodiment may be varied, as above indicated.

It will be observed that each of the embodiments shown in Figs. 15 to 20 possesses the aforementioned advantageous features of the previously described embodiment and it will be further noted that a lock-nut constructed in accordance with the present invention provides a strong and durable article of minimum size and weight and possesses an efficient and reliable locking action which permits the lock-nut to be reused indefinitely. Moreover, the lock-nut may be quickly and easily applied in close quarters and merely requires the use of a conventional wrench of the type herein shown. Because of these advantageous features, a lock-nut constructed in accordance with the present invention has a wide range of applications and is particularly suitable for use in the aircraft industry where the aforementioned advantages are of primary importance.

Figure 21:
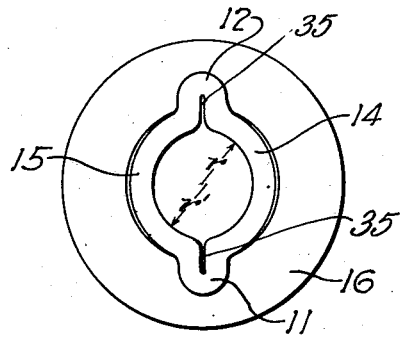
Fig. 21 is a top plan view of a completed lock-nut, illustrating the varying effective diameter and the substantially unvarying radius of curvature of the threaded segments.

An important feature of the invention, common to each of the above-described embodiments, is illustrated in Fig. 21 which shows the relationship of the segments and ribs after the closing-in operation. It will be observed, by a comparison of Figs. 5 to 9 with Figs. 10 to 12 and 21, that prior to the closing-in operation the effective diameter of the barrel (excluding the gap defined by the ribs) is uniform and unvarying throughout the extent of the bore, whereas after the closing-in operation the effective diameter of the barrel progressively decreases from the point defining the inner limit of free lead to the outer end, although the radius of curvature $r$ and $r'$ (Fig. 21) remains constant or unvarying.

It will also be observed that as an incident to the closing-in operation the distance across the top of the barrel from the exterior of one rib to the other may be increased somewhat relative to the corresponding distance at the base portion of the barrel, as shown by a comparison of Figs. 7 and 11, and that the segments 14 and 15 tend to converge, presenting somewhat of a frusto-conical appearance, as shown by comparing Figs. 9, 12, 19 and 20, while the width of the gaps 35, defined by the ribs 11 and 12, also decreases correspondingly. The dimensional changes thus produced do not effect a variation in the radius of curvature $r$ and $r'$ and it is, of course, highly desirable, if not necessary, that the closing-in operation be so conducted as not to cause appreciable distortion in the radius of curvature of the threaded areas.

Although, as above indicated, the closing-in operation may be performed by any of several different types of instrumentalities, a preferred type is shown in Figs. 22 to 24, wherein the numeral 50 designates the bed of a conventional punch press, which carries a dial indexing fixture 51 having a dial 52 arranged in cooperative relation to the reciprocating punch holder 55. The dial may be provided with a plurality of stations, each formed with suitable opening to receive a loose fitting pilot 56 adapted to hold in position a lock-nut N with its flanged base squarely positioned on the area surrounding the pilot, as illustrated in Fig. 22.

The punch holder 55 may be of conventional design and construction, having a central longitudinally extending bore in which a knock-out pin 58 has a free sliding fit with its headed upper end projecting upwardly beyond the body of the holder. The lower end of the holder is formed with a cylindrical recess concentric with the bore for receiving the closing-in die or tool 60.

The die 60 is preferably of hardened steel made in two parts to facilitate manufacture, and its outer surface is shaped so that it has a snug fit within the recess, being locked therein by set screws 61. The die 60 is formed with a cavity 62 having a circular entrance slightly larger than the barrel diameter of the nut N, and relieved or rounded, as indicated at 64, to pilot the nut into its interior. The inner walls 65 of the cavity taper toward the center and are shaped as shown in Figs. 23 and 24, thus reducing the inner working diameter of the die normal to the split axis, although the radius of curvature of the working areas remains constant. The side walls are also formed at diametrically opposite points with lateral recesses 66 (Fig. 24) which loosely receive the ribs of the nut N.

The operating cycle is as follows: On the upstroke of the press the dial 52, which carries the pilots 56 on which the nuts N are manually or automatically position, is automatically indexed so that the nut to be operated on is correctly positioned relative to the closing-in tool 60 and remains so during the down-stroke of the punch slide which carries the holder 55 and die 60. The design and construction of the die 60 is such that downward movement of the die causes lateral pressure to be exerted on the threaded segments of the nut N and because of the shape and angle of taper of the walls 65 the segments of the nut are forced inwardly beyond the elastic limits of the inherent spring or resilient character of the expansion ribs and segments thus causing a permanent set to take place in the affected portions of the nut.

As above noted, the degree of "set" is so determined that the pitch diameter of the threaded segments is appreciably less than that of the corresponding screw and in any case may be varied to suit the particular application involved. Hence the particular design of the die 60 will vary in accordance with the particular application involved, as well as type of stock, size of nut and such other variables as will be recognized by those skilled in the art.

After the closing punch has completed its downstroke, the nut will be wedged in the die cavity and on the return or up-stroke of the punch will be carried up with the die, it being noted that due to the loose fit of the nut N on the pilot 56 the nut will be lifted clear of the pilot. At a predetermined point in the up-stroke of the punch a knock-out bar (which is standard equipment on presses of this type) comes into operation, engaging the knock-out pin 58 which ejects the completed nut from the die 60. The nut then falls either into a stream of compressed air, or in the path of a mechanically operated "pickoff," either of which clears the work from the press preparatory to the following working cycle.

Where it is desired to vary the degree of free lead, as illustrated in Figs. 19 and 20, it is merely necessary to adjust the press slide, either raising or lowering the required amount to cause the closing-in operation to be performed on that portion of the barrel length desired.

While I have shown and described several desirable embodiments of the invention, it is to be understood that this disclosure is for the purpose of illustration and that various changes and modifications in shape, proportion and arrangement of parts, as well as the substitution of equivalent elements for those herein suggested, may be made without departing from the spirit and scope of the invention as set forth in the appended claims.

I claim:

1. The method of making a lock-nut which comprises subjecting a strip of sheet metal to progressive stamping and drawing operations to form a stage product having a barrel portion provided with at least one longitudinally extending expansion rib defining at least one radially expansible segment and a relatively rigid non-yielding base portion, threading the interior of the expansible segment, and subjecting the threaded segment to a closing-in operation to reduce the effective diameter of the upper end portion of the barrel without appreciably changing the radius of curvature of the expansible segment, while leaving the base portion in substantially its original condition.

2. The method of making a lock-nut which comprises subjecting a strip of sheet metal to progressive stamping and drawing operations to form a stage product having a barrel portion provided with a plurality of longitudinally extending expansion ribs circumferentially spaced so as to define a plurality of expansible segments and a relatively rigid outwardly extending base portion, threading the interior of the expansible segments, and subjecting the threaded segments to a closing-in operation to reduce the effective diameter of the upper end portion of the barrel without appreciably changing the radius of curvature of the expansible segments, while leaving the base portion in substantially its original condition.

3. The method of making a lock-nut which comprises subjecting a strip of sheet metal to progressive stamping and drawing operations to form a stage product having a barrel portion provided with a pair of diametrically opposed longitudinally extending expansion ribs defining a pair of expansible segments and a relatively rigid non-yielding flanged base, threading the interior walls of the expansible segments, and subjecting the threaded segments to a closing-in operation to reduce the effective diameter of the upper end portion of the barrel, without appreciably changing the radius of curvature of the expansible segments, while leaving the base portion in substantially its original condition.

4. The method of making a lock-nut which comprises subjecting a strip of sheet metal to progressive stamping and drawing operations to form a stage product having a barrel portion provided with at least one longitudinally extending expansion rib defining at least one radially expansible segment and a relatively rigid non-yielding base portion, threading the interior of the expansible segment, and subjecting the threaded segment to a closing-in operation gradually to reduce the effective diameter of the barrel from a point spaced inwardly of the base portion to the upper end of the barrel without appreciably changing the radius of curvature of the expansible segment, while leaving the base portion in substantially its original condition, thereby to provide a predetermined free lead when the lock-nut is applied to a bolt or the like threaded element.

5. The method of making a lock-nut which comprises subjecting a strip of sheet metal to progressive stamping and drawing operations to form a stage product having a barrel portion provided with a plurality of longitudinally extending expansion ribs circumferentially spaced so as to define a plurality of expansible segments and a relatively rigid outwardly extending base portion, threading the interior walls of the expansible segments, and subjecting the threaded segments to a closing-in operation gradually to reduce the effective diameter of the barrel from a point spaced inwardly from the base portion to the upper end of the barrel without appreciably changing the radius of curvature of the expansible segments, while leaving the base portion in substantially its original condition, thereby to provide a predetermined free lead when the lock-nut is applied to a bolt or the like threaded element.

6. A unitary lock-nut fabricated from sheet metal and comprising a barrel portion having at least one longitudinally extending expansion rib defining at least one expansible segment and a relatively rigid non-yieldable base portion, the interior wall of said segment being threaded and said segment being closed in to an extent sufficient to reduce the effective diameter of the upper end portion of the barrel, relative to the base portion, but having a uniform radius of curvature throughout, said expansion rib permitting said segment to expand radially, the radial movements of said segment to and from expanded position, when applied to a bolt or the like threaded element, being within the limits of elasticity imparted by the expansion rib.

7. A unitary lock-nut fabricated from sheet metal and comprising a barrel portion having a plurality of longitudinally extending circumferentially spaced expansion ribs defining a plurality of expansible segments and a relatively rigid non-yielding base portion, the interior walls of said segments being threaded and said segments being closed in an extent sufficient to reduce the effective diameter of the upper end portion of the barrel relative to the base portion but having the same uniform radius of curvature throughout, said expansion ribs permitting said segments to expand radially, the radial movements of said segments to and from expanded position, when applied to a bolt or the like threaded element, being within the limits of elasticity provided by the expansion ribs and segments.

8. A unitary lock-nut fabricated from sheet metal and comprising a barrel portion having a pair of diametrically opposed longitudinally extending expansion ribs defining a pair of expansible segments and a relatively non-yielding flanged base member, the interior walls of said segments being threaded and said segments being closed in an extent sufficient to reduce the effective diameter of the upper end portion of the barrel relative to the base portion but having the same uniform radius of curvature throughout, said expansion ribs permitting said segments to expand radially, the radial movements of said segments to and from expanded position when applied to a bolt or the like threaded element, being within the limits of elasticity provided by the expansion ribs.

9. A unitary lock-nut fabricated from sheet metal and comprising a barrel portion having at least one longitudinally extending expansion rib defining at least one expansible segment and a relatively rigid non-yielding base portion, the interior wall of said segment being threaded and said segment being closed in to an extent sufficient gradually to reduce the effective diameter of the barrel from a point spaced inwardly of the base portion to the upper end of the barrel, thereby to provide a predetermined degree of free lead, said segment having a uniform radius of curvature throughout and said expansion rib permitting said segment to expand radially and the radial movements of said segment to and from expanded position, when applied to a bolt or the like threaded element, being within the limits of elasticity provided by the expansion rib and segment.

10. A unitary lock-nut fabricated from sheet metal and comprising a barrel portion having a plurality of longitudinally extending circumferentially spaced expansion ribs defining a plurality of expansible segments, and a relatively rigid non-yielding flanged base portion, the interior walls of said segments being threaded and said segments being closed in an extent sufficient gradually to reduce the effective diameter of the barrel from a point spaced inwardly of the base portion to the upper end of the barrel, thereby to provide a predetermined degree of free lead, said segments having the same uniform radius of curvature throughout and said expansion ribs permitting said segments to expand radially, the radial movement of said segments to and from expanded position, when applied to a bolt or the like threaded element, being within the limits of elasticity provided by the expansion ribs.

JOSEPH F. COX.